United States Patent [19]
Suzuki et al.

[11] Patent Number: 6,023,595
[45] Date of Patent: *Feb. 8, 2000

[54] IMAGE PROCESSING APPARATUS CAPABLE OF REMOTELY DIAGNOSING FAILED PORTION OF IMAGE PROCESSING UNIT

[75] Inventors: Takashi Suzuki, Tokyo; Shinobu Arimoto, Yokohama; Nobuyuki Watanabe, Yokohama; Kazuhito Ohashi, Yokohama; Akiko Kanno, Kashiwa; Hiroyuki Tsuji, Yokohama; Tetsuya Nakamura, Kawasaki; Shingo Kitamura, Minemachi; Tsunao Honbo, Kawasaki; Junichi Noguchi, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/848,616

[22] Filed: Apr. 29, 1997

[30] Foreign Application Priority Data

May 7, 1996 [JP] Japan .................................. 8-112803

[51] Int. Cl.$^7$ ................................................. G03G 15/02
[52] U.S. Cl. ........................... 399/31; 324/511; 324/528; 340/653; 358/406; 399/32
[58] Field of Search ................... 399/9, 11, 31, 399/32; 340/653; 324/511, 527, 528; 358/406, 443, 518, 504

[56] References Cited

U.S. PATENT DOCUMENTS

| 3,653,759 | 4/1972 | Klein ......................................... 355/38 |
| 4,862,219 | 8/1989 | Yoshida et al. . |
| 4,870,447 | 9/1989 | Yoshida et al. . |
| 5,001,655 | 3/1991 | Higano et al. ...................... 364/551.01 |
| 5,337,319 | 8/1994 | Furukawa et al. ..................... 371/11.1 |
| 5,436,854 | 7/1995 | Takada et al. ..................... 364/571.01 |
| 5,719,881 | 2/1998 | Yonetoku .................................. 371/27 |

FOREIGN PATENT DOCUMENTS

| 4-093267 | 3/1992 | Japan . |
| 8-289062 | 11/1996 | Japan . |

*Primary Examiner*—Robert Beatty
*Attorney, Agent, or Firm*—Fitzpatrick, Cella, Harper & Scinto

[57] ABSTRACT

It is an object to identify a failed portion in a circuit for image processing and notify a service center of the failed portion, thereby enabling the failed circuit to be promptly replaced. Circuit portions of image processing units are constructed on separate substrates. As processing routes of an image signal which is inputted from an A/D converting unit, a route in which the image signal passes through a given circuit portion and a route in which the image signal doesn't pass therethrough are set. Data of a predetermined pattern is processed by those processing routes. The presence or absence of a failure of each circuit portion is discriminated from the processing results. The discrimination result is transmitted to an external apparatus installed in a service center.

43 Claims, 12 Drawing Sheets

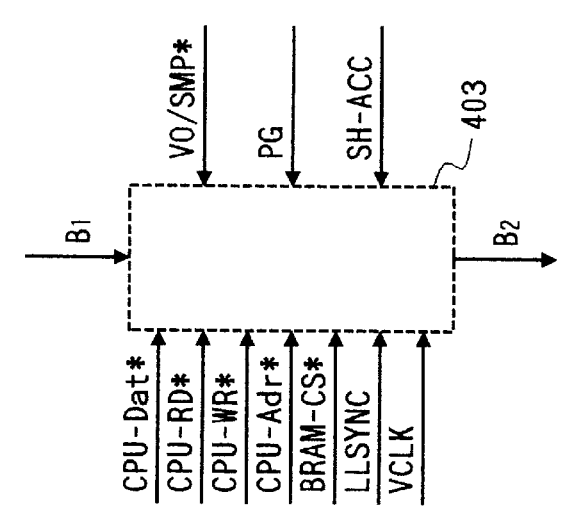
FIG. 4A BLOCK FOR SIGNAL OF RED
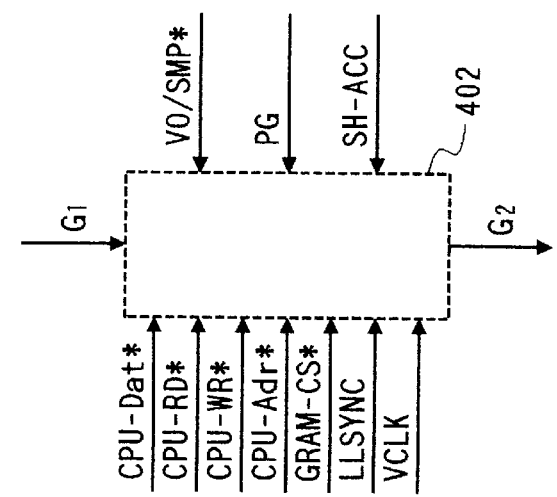
FIG. 4B BLOCK FOR SIGNAL OF GREEN
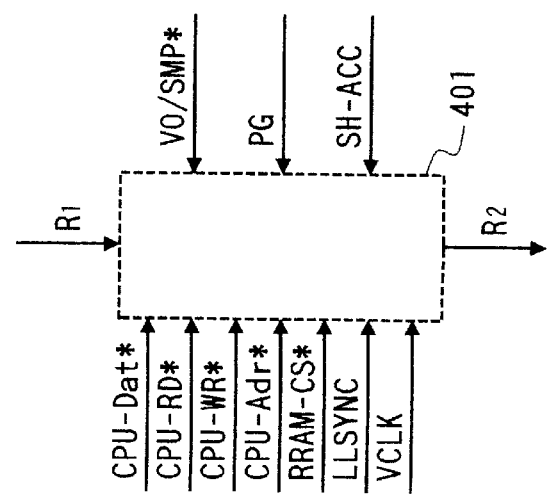
FIG. 4C BLOCK FOR SIGNAL OF BLUE

FIG. 9

| | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| RED | ADDRESS | 0 | 1 | 2 | 3 | 4 | | 254 | 255 | 256 | 257 | 258 | 259 | | 4996 | 4997 | 4998 | 4999 |
| | DATA | 0 | 1 | 2 | 3 | 4 | | 254 | 255 | 0 | 1 | 2 | 3 | | 132 | 133 | 134 | 135 |
| GREEN | ADDRESS | 0 | 1 | 2 | 3 | 4 | | 254 | 255 | 256 | 257 | 258 | 259 | | 4996 | 4997 | 4998 | 4999 |
| | DATA | 0 | 1 | 2 | 3 | 4 | | 254 | 255 | 0 | 1 | 2 | 3 | | 132 | 133 | 134 | 135 |
| BLUE | ADDRESS | 0 | 1 | 2 | 3 | 4 | | 254 | 255 | 256 | 257 | 258 | 259 | | 4996 | 4997 | 4998 | 4999 |
| | DATA | 0 | 1 | 2 | 3 | 4 | | 254 | 255 | 0 | 1 | 2 | 3 | | 132 | 133 | 134 | 135 |

IMAGE PROCESSING APPARATUS CAPABLE OF REMOTELY DIAGNOSING FAILED PORTION OF IMAGE PROCESSING UNIT

BACKGROUND OF THE INVENTION

1. Field of the Invention

The invention relates to an image processing apparatus which can remotely diagnose a failed portion of an image processing unit.

2. Related Background Art

Hitherto, although an image processing apparatus such as a copying apparatus or the like has a plurality of circuit boards (substrates) for image processes, when an abnormality occurs in an image to be outputted, it is difficult to discriminate whether any one of the image processing circuit boards has failed or not and to determine which board has failed. Therefore, there are needed steps such that the user first finds out an abnormality of an image, the user subsequently reports it to a service center, the service person checks a failed portion on the spot and brings back the part or the apparatus to the service center and repairs it, and after that, he brings the repaired part or apparatus back to the user.

There is, consequently, a drawback in that it takes time until a normal state can be resumed after an abnormality has occurred in an output image of the image processing apparatus.

SUMMARY OF THE INVENTION

It is an object of the invention to provide an image processing apparatus which can solve the foregoing problems.

Another object of the invention is to provide an image processing apparatus which can specify a circuit to be replaced among a plurality of image processing circuits and can promptly notify an external apparatus installed in a service center or the like.

Still another object of the invention is to provide an image processing apparatus which can remote-diagnose a failed portion of an image processing unit.

The above and other objects and features of the present invention will become apparent from the following detailed description and the appended claims with reference to the accompanying drawings.

BRIEF DESCRIPTION OF THE DRAWINGS

FIGS. 4A, 4B and 4C are block diagrams of a shading correction unit shown in FIG. 1;

FIG. 9 is a diagram showing data written in the shading correction unit;

DETAILED DESCRIPTION OF THE PREFERRED EMBODIMENTS

First Embodiment

A color image forming apparatus as a first embodiment of the invention will now be described.

Whole Construction

Figure 1:
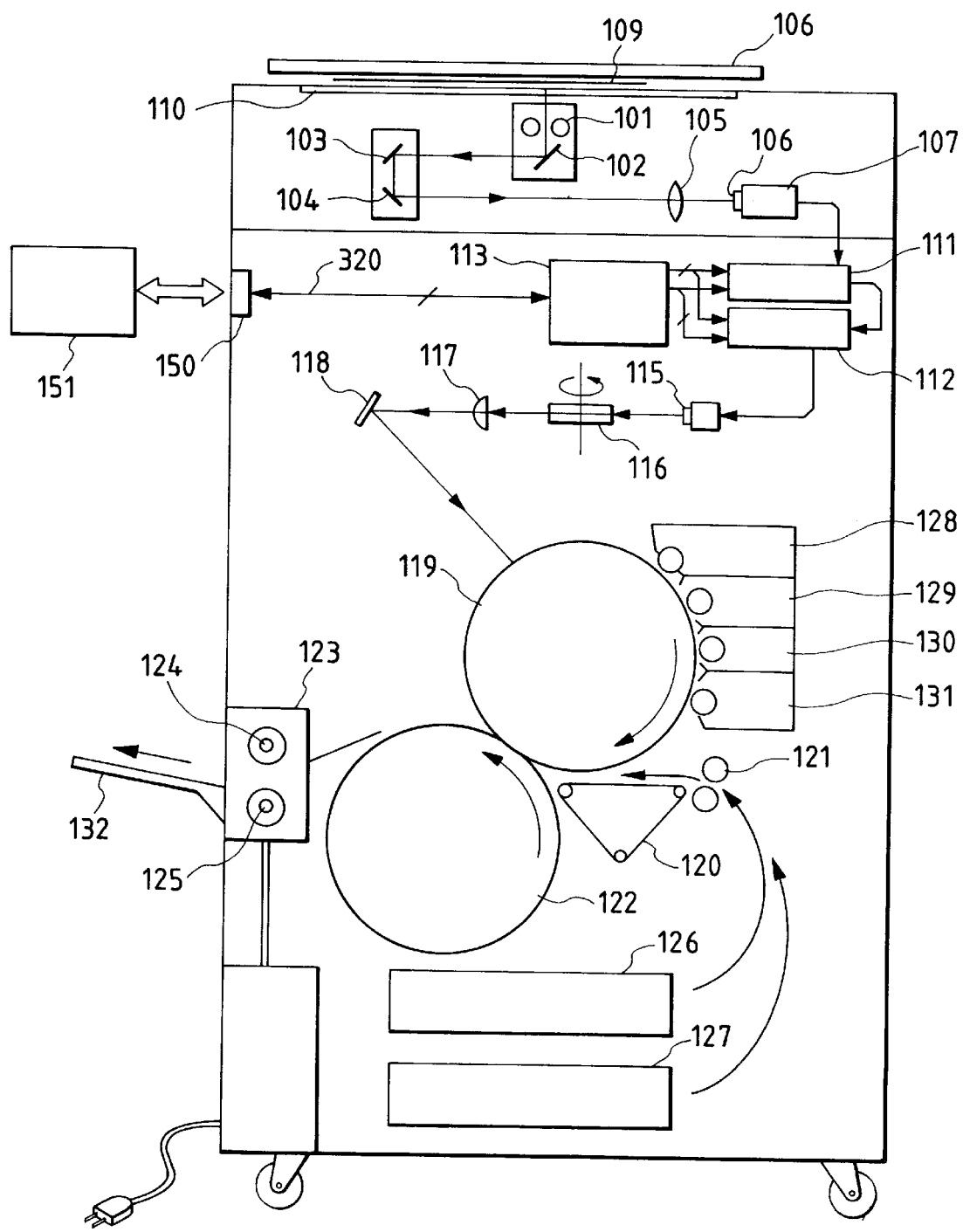
FIG. 1 is a schematic constructional diagram of a whole copying apparatus according to the first embodiment of the invention.

FIG. 1 is a schematic cross sectional diagram of the color image forming apparatus of is embodiment.

An original 109 is put on an original supporting glass plate 110 and is exposed and scanned by an exposure lamp 101, thereby converging a reflection light image from the original 109 onto a full color sensor 106 by a lens 105 via reflecting mirrors 103 and 104, thereby obtaining a color separation image signal. The color separation image signal passes through an A/D conversion amplifying unit 107 and is subjected to a process by an image processing unit 111 and is inputted to a laser driver 112.

A photosensitive drum 119, used as an image supporting element, is supported so as to be rotatable in the direction shown by an arrow. Four developing devices 128, 129, 130, and 131 for different colors are arranged around the photosensitive drum 119. In a laser exposure optical system, the image signal is converted into a photosignal by a laser output unit 115 which is driven by the laser driver 112. The converted laser beam is reflected by a polygon mirror 116 and passes through a lens 117 and is reflected by a mirror 118 and is projected onto the surface of the photosensitive drum 119.

When an image is formed by a printer unit, the photosensitive drum 119 is first rotated in the direction of the arrow and the light image of each separation color is irradiated onto the photosensitive drum 119, thereby forming a latent image.

A predetermined developing device is made operative, the latent image on the photosensitive drum 119 is developed, and a toner image consisting of a resin as a main material is formed onto the photosensitive drum 119.

Further, the toner image on the photosensitive drum 119 is transferred onto a recording material which is supplied to the position which faces the photosensitive drum 119. The recording material is supplied from a recording material cassette 126 or 127 to the position which faces the photosensitive drum 119 through a conveying system 120 and a transfer drum 122. In response to the rotation of the transfer drum 122, the toner image on the photosensitive drum is transferred onto the recording material held on the transfer drum 122.

As mentioned above, a desired number of color images are transferred onto the recording material and a full color image is formed. In a case of forming a full color image, after completion of the transfer of the toner images of four colors as mentioned above, the recording material is separated from the transfer drum 122 and is ejected to a tray 132 through a fixing device 123 having fixing rollers 124 and 125.

The apparatus can communicate with external apparatuses by an I/F unit 113. For example, by connecting the apparatus to a commercially available modem unit, the apparatus can communicate with a personal computer on a service base of a copying apparatus by using a public telephone line.

The I/F unit 113 in FIG. 1 is connected to an I/F converting unit 150 and can communicate with an external apparatus 151 through the I/F converting unit 150. The I/F converting unit 150 is a well-known circuit for converting a serial communication of a CPU in the copying apparatus into a form compatible with the standard of the public telephone line. The external apparatus 151 is installed in a service center or the like.

Figure 2:
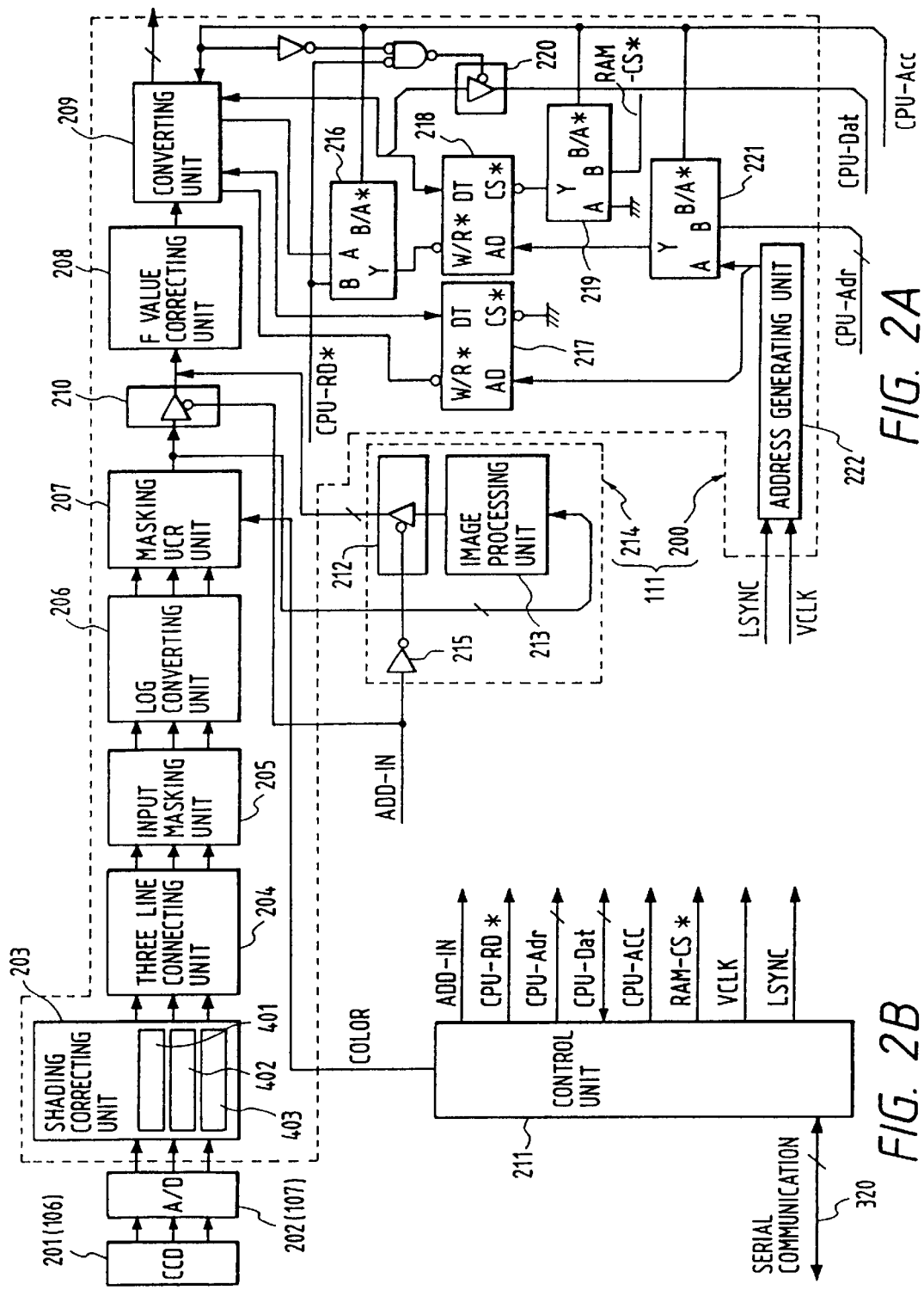
FIG. 2A is a block diagram of an image processing unit shown in FIG. 1
FIG. 2B is a block diagram of a control unit in an I/F unit shown in FIG. 1.

FIG. 2A is a block diagram for explaining the image processing unit 111 in FIG. 1. In FIG. 2A, portions 200 and 214 surrounded by broken lines indicate image processing circuits formed on separate substrates.

Reference numeral 201 denotes a 3-line CCD for color separating the reflection light from the original and converting into electric signals. In FIG. 1, the CCD 201 corresponds to the full color sensor 106. Reference numeral 202 denotes an A/D converting unit for converting analog RGB signals from the CCD 201 into digital signals. The A/D converting unit 202 corresponds to the A/D conversion amplifying unit 107 in FIG. 1. A shading correction unit 203 corrects a sensitivity of each pixel of the CCD 201, thereby correcting a gradient of a light amount of a light source. Signals of R (red), G (green), and B (blue) are outputted from the A/D converting unit in the form of digital image signals of eight bits.

Three CCD line sensors for R (red), G (green), and B (blue) are arranged in the CCD 201 with certain predetermined distances. Therefore, the digital image signals from the CCD line sensors have time-dependent deviations which are caused by those spatial deviations. In a three line connecting unit 204 in FIG. 2A, the time-dependent deviations are corrected for.

An input masking unit 205 executes an operation to correct spectral characteristics of RGB of the CCD 201 into a standard RGB space. A LOG converting unit 206 is a lookup table constructed of a RAM and converts luminance signals of R (red), G (green), and B (blue) into density signals of C (cyan), M (magenta), and Y (yellow), respectively.

A masking UCR unit 207 executes an operation to remove color turbidity of the toner which is used for printing and recording from the inputted density signals of C (cyan), M (magenta), and Y (yellow), thereby generating a Bk (black) signal. An F value correcting unit 208 is a correction table for correcting a density value (F value) in accordance with the designation of print density color by color. A converting unit 209 is a converting circuit for changing the size of the image.

Control Unit

Figure 3:
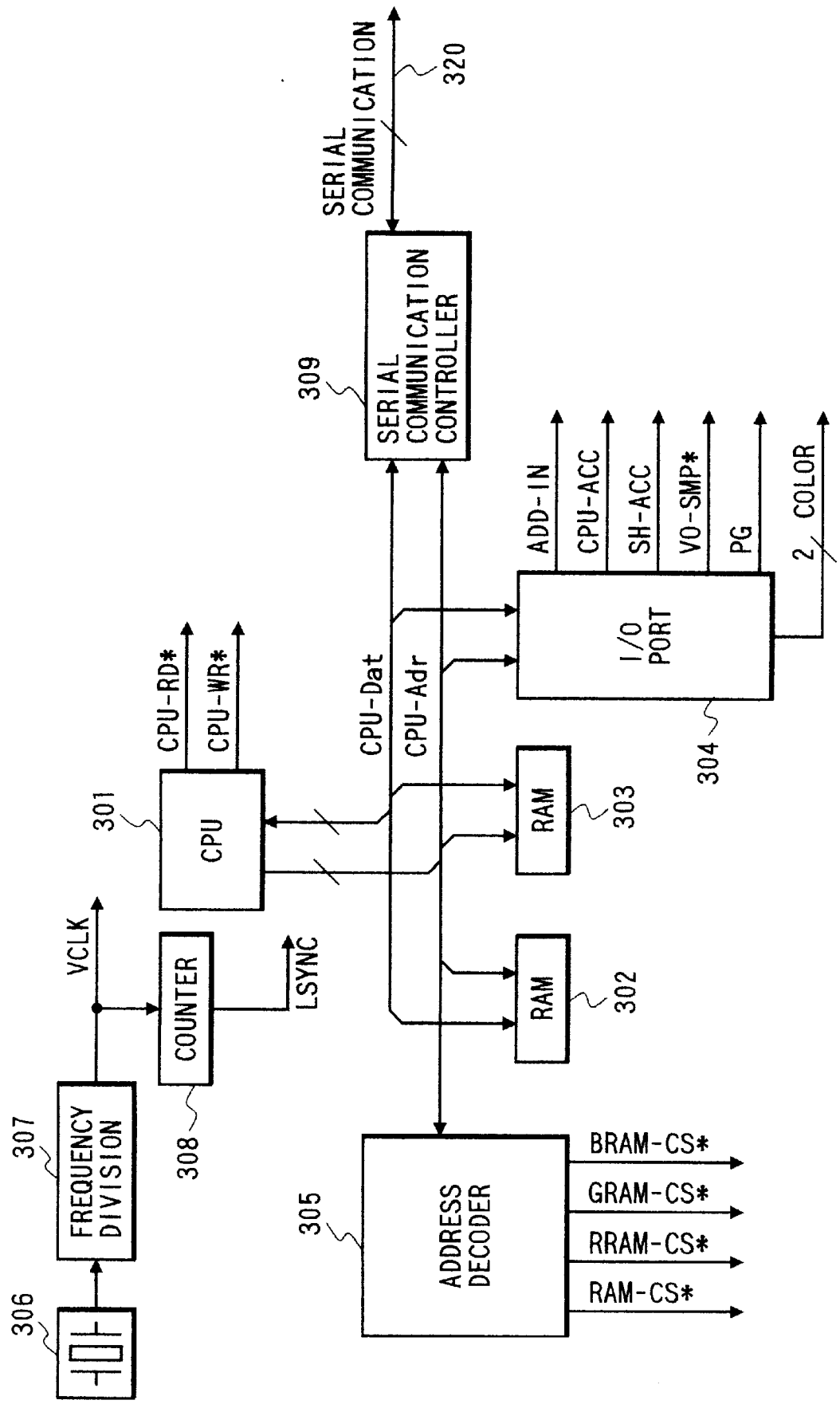
FIG. 3 is a block diagram of the control unit shown in FIG. 2B.

A control unit 211 in FIG. 2B exists in the I/F unit 113 in FIG. 1. FIG. 3 is a block diagram of the control unit 211.

Reference numeral 301 denotes a microcomputer (hereinafter, abbreviated to "CPU") to control the apparatus. The CPU 301 outputs a read signal CPU-RD* of the CPU 301 and a write signal CPU-WR* of the CPU 301. CPU-Dat denotes a data bus of the CPU 301 and CPU-Adr indicates an address bus of the CPU 301. Reference numeral 302 denotes a ROM in which a program for making the CPU 301 operative has been stored; 303 a RAM which is used as a work area to execute various programs; and 304 an input/output port (hereinafter, referred to as an "I/O port") which is connected to the CPU 301. An ADD-IN signal, a CPU-ACC signal, a SH-ACC signal, a VO/SMP* signal, a PG signal, and a COLOR signal are signals which are outputted from the I/O port 304. A serial communication controller 309 to perform serial communication with the external apparatus is connected to the CPU 301.

An input/output line 320 for communication by a serial communication controller in FIG. 3 is connected to the I/F converting unit 150 in FIG. 1 and is connected to the external apparatus 151 through the I/F converting unit.

Figure 6:
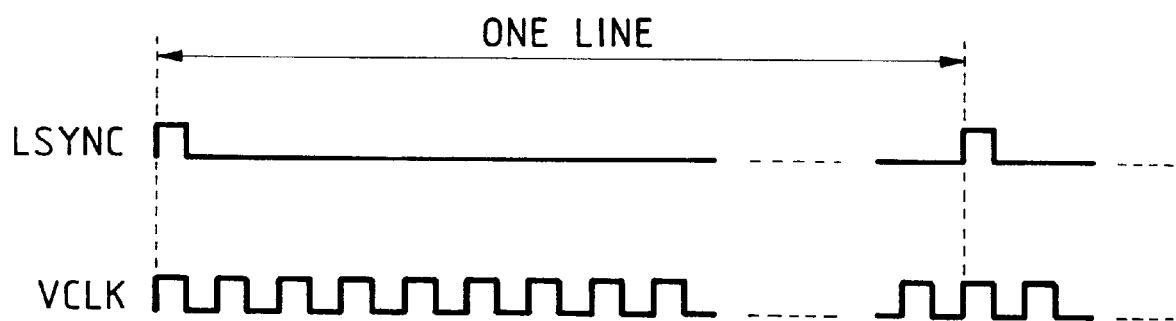
FIG. 6 is an explanatory diagram of a sync signal.

Reference numeral 306 denotes an oscillator for generating a fundamental clock VCLK to process the image. The fundamental clock VCLK is obtained by frequency dividing an output of the oscillator 306 by a frequency division circuit 307 into ¼. The number of clocks VCLK is counted by a counter 308, thereby forming a sync signal LSYNC of every line as shown in FIG. 6.

In FIG. 2A, reference numeral 210 denotes a tristate buffer. When the ADD-IN signal is set to "1", an output of the tristate buffer 210 is set to the high impedance. The image signal flows in accordance with the order of the masking UCR unit 207, an image processing unit 213, a tristate buffer 212, and the F value correcting unit 208. On the contrary, when the ADD-IN signal is set to "0", the image signal flows in accordance with the order of the masking UCR unit 207, tristate buffer 210, and F value correcting unit 208. The image processing unit 213 is a portion to perform a process such as an extraction of an outline portion of the image or the like.

Shading Correcting Unit

In FIG. 2A, the shading correcting unit 203 corrects the sensitivity of each pixel of the CCD 201 and corrects the gradient of the light amount of the light source as mentioned above. The shading correcting unit 203 is constructed by a block 401 for a signal of Red as shown in FIG. 4A, a block 402 for a signal of Green as shown in FIG. 4B, and a block 403 for a signal of Blue as shown in FIG. 4C. Each of the blocks 401 to 403 is constructed of substantially the same circuit except that the signal to be inputted is different.

Figure 5:
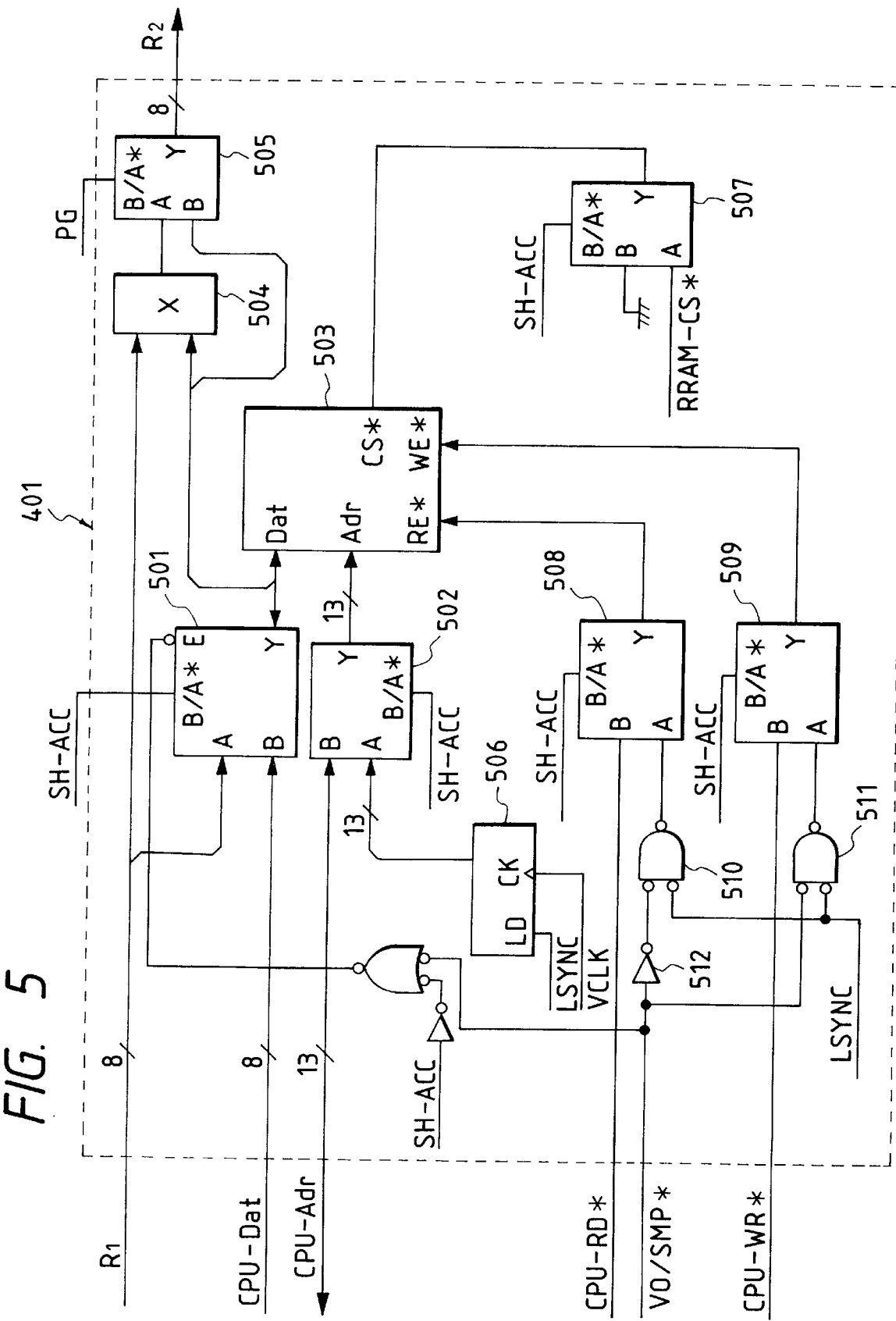
FIG. 5 is a constructional diagram of a block for a signal of red shown in FIG. 4A.

FIG. 5 is a detailed block diagram of the block 401 for the signal of Red.

In FIG. 5, reference numeral 504 denotes a multiplier for multiplying output data of RAM 503 and input image data R1. In an ordinary copy mode, VO/SMP* is set to "1" and SH-ACC is set to "0". In this instance, an output of a counter 506 which is inputted from an A terminal of a selector 502 is inputted as an address of the RAM 503. A value corresponding to a correction value of every pixel has previously been written in the RAM 503 by the CPU 301. When the data in the RAM 503 is read out or written by the CPU 301, SH-ACC is set to "1". When SH-ACC is set to "1", a B terminal and a Y terminal of each of selectors 501, 502, 508, and 509 are connected, respectively. The CPU address bus CPU-Adr and the CPU data bus CPU-Dat are connected to the RAM 503, and CPU-RD* and CPU-WR* can be inputted.

When SH-ACC is set to "0" and VO/SMP* is set to "0", for a period of time during which LSYNC is set to "0", "1" is inputted to a RE* terminal of the RAM 503 and "0" is inputted to a WE* terminal thereof, so that the image data R1 is written into the RAM 503. After that, SH-ACC is set to "1" and the CPU 301 reads the data and rewrites the data in the RAM 503 to a correction value of every pixel.

A mode when PG is set to "0" corresponds to the ordinary copy mode and an output of the multiplier 504 is outputted as R2 from a selector 505. When VO/SMP* is set to "1" and PG is set to "1", the data in the RAM 503 is outputted as it is from the selector 505. Therefore, by writing the data of predetermined patterns into the RAM 503 by memory of the CPU 301, the RAM 503 can be allowed to function as a pattern generator. For example, by sequentially repetitively writing data of "0" to "255" into all addresses in the RAM 503 from address 0, the data of "0" to "255" is repetitively outputted as R2.

Each of the blocks 402 and 403 for signals of Green and Blue is constructed in a manner similar to the block 401 for signal of Red in FIG. 5 as mentioned above. Those input image data are set to G1 and B1 and outputs of the blocks 402 and 403 assume values G2 and B2.

Magnification Unit

In a digital full color copying apparatus, a variable magnification in the main scanning direction is performed by controlling the writing and reading operations into/from memories for magnification (RAMs) 217 and 218 (refer to FIG. 2A) of the image data. That is, by continuously reading out the same image data from the memory, the image data is enlarged. By thin the image data to be written into the memory and writing the thinned image data therein, the image data is reduced. An address generating unit 222 is a counter for forming addresses for the RAMs 217 and 218. A signal to control the writing and reading operations of the RAMs 217 and 218 is inputted to a W/R* terminal.

When CPU-ACC is set to "1", a B terminal and a Y terminal of each of selectors 221, 219, and 216 are connected, so that the CPU address bus CPU-Adr and CPU data bus CPU-Dat are connected to the RAM 218 and CPU-RD* can be inputted. Therefore, by setting CPU-ACC to "1" at the time of a self-diagnosis or the like, the CPU 301 can read the data in the RAM 218 for magnification.

Self-Diagnosing Operation

Figure 7A:
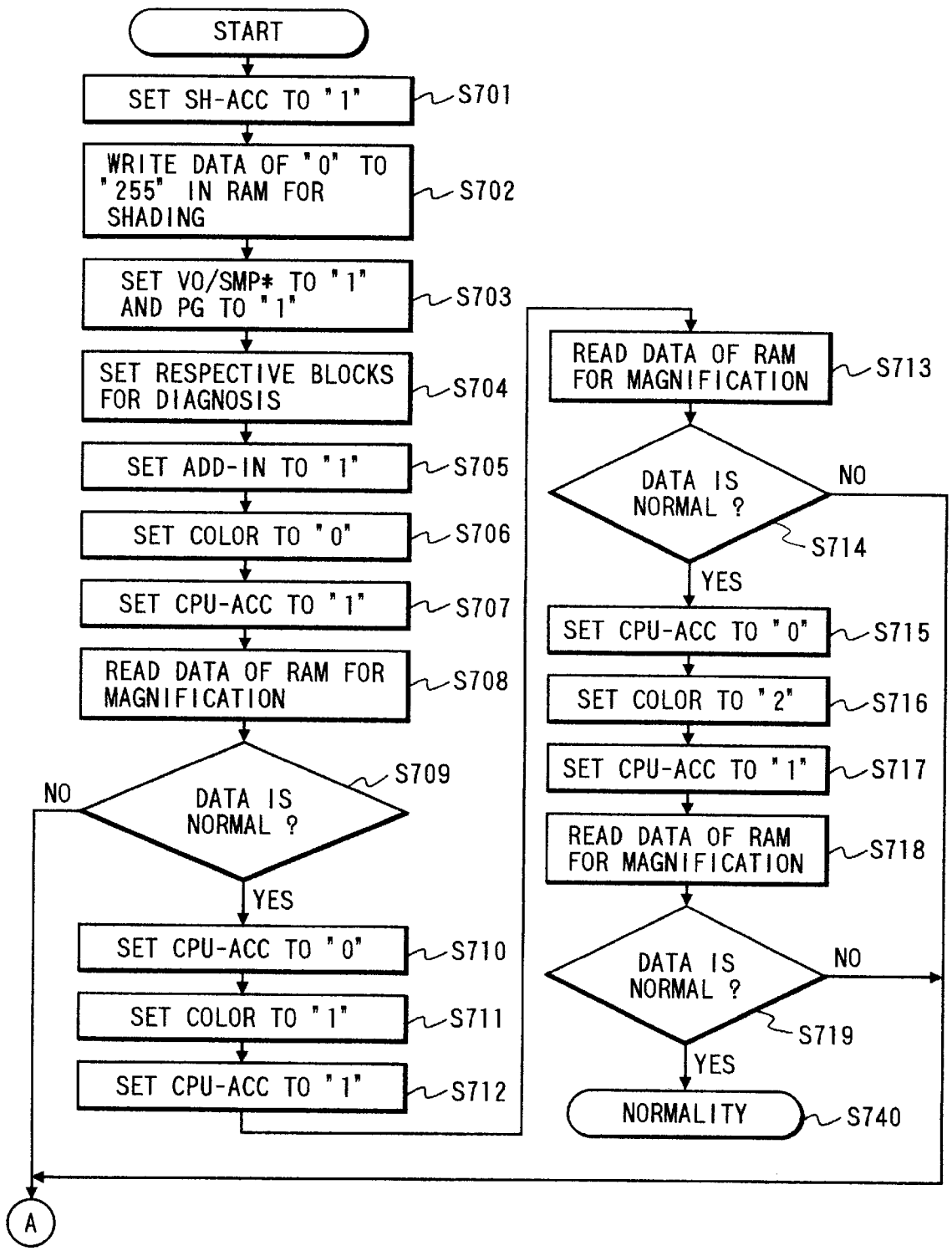
FIGS. 7A and 7B are flowcharts for explaining a self-diagnosing operation in the first embodiment of the invention.
Figure 7B:
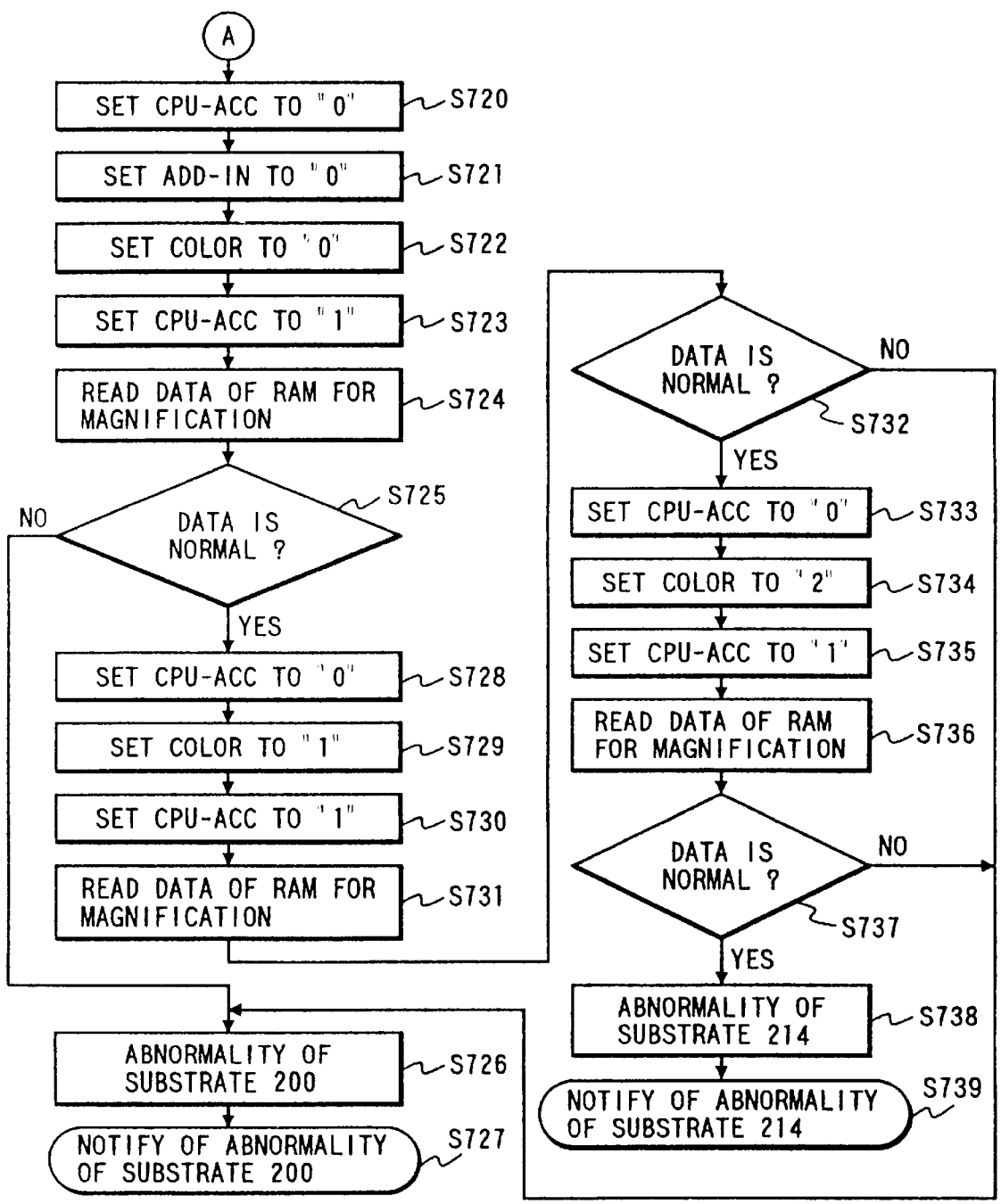

When a power supply is turned on, self-diagnosis is executed for a period of time of waiting-up of the copying apparatus. A procedure in this instance will now be described in accordance with a flowchart of FIGS. 7A and 7B.

First in step S701, SH-ACC is set to "1". In step S702, the data of "0" to "255" is sequentially repetitively written into all addresses in the shading correcting RAM 503 of the shading correction unit 203 from address 0. The data constructs a test chart for a diagnosis.

The RAM 503 is a memory for Red, and a RAM for Green and a RAM for Blue similarly exist in the blocks 402 and 403 in FIGS. 4B and 4C, respectively. The data of "0" to "255" are repetitively written into all addresses (as many as 5000 pixels) in each RAM as shown in FIG. 9.

In step S703, VO/SMP* is set to "1" and PG is set to "1", thereby allowing the data of "0" to "255" to be repetitively outputted as R2, G2, and B2 to the three line connecting unit 204.

In step S704, the three line connecting unit 204, input masking unit 205, LOG converting unit 206, masking UCR unit 207, image processing unit 213, F value correcting unit 208, and magnification unit are set in a manner such that each of the input data is outputted as it is without being subjected to the correction, image process, magnification, and the like.

The above setting operation makes it possible to find out a failed portion by checking a coincidence between the data written in the shading correction unit 203 and the data written in the RAM 218 for magnification at the time of the self-diagnosis.

A method of setting in a rule such that the data is outputted as it is to the masking UCR unit 207 without being corrected will now be described as an example.

The COLOR signal of two bits is inputted to the masking UCR unit 207 in FIG. 2A. The COLOR signal is outputted from the I/O port 304 in FIG. 3 in the control unit 211 and is a signal for switching area sequential output colors when producing area sequential signals of M' (magenta), C' (cyan), Y' (yellow), and BK (black) from the signals of M (magenta), C (cyan), and Y (yellow) which are inputted to the masking UCR unit 207. That is, when the COLOR signal is set to "0", the M' (magenta) signal is outputted. When the COLOR signal is set to "1", the C' (cyan) signal is outputted. When the COLOR signal is set to "2", the Y' (yellow) signal is outputted. When the COLOR signal is set to "3", the BK (black) signal is outputted.

The masking UCR unit 207 generates the M', C', Y', and BK signals by performing the following operations on the input signals.

$$M'=aM \times M + bM \times C + cM \times Y + dM \times BK$$

$$C'=aC \times M + bC \times C + cC \times Y + dC \times BK$$

$$Y'=aY \times M + bY \times C + cY \times Y + dY \times BK$$

$$BK=\min(M, C, Y)$$

Therefore, in the self-diagnosis mode, $$aM=bC=cY=1$$

$$bM=cM=aC=CC=aY=bY=dM=dC=dY=0$$

are set so as to obtain $$M'=M$$

$$C'=C$$

$$Y'=Y$$

In step S705, ADD-IN is set to "1". By setting the ADD-IN signal to "1", the signal passes through the image processing unit 213.

In step S706, COLOR is set to "0", thereby allowing the M signal to be outputted from the output of the masking UCR unit 207.

In this state, in step S707, CPU-ACC is set to "1". In step S708, the CPU 301 reads the image data written in the RAM 218 for magnification. In step S709, if the data read by the CPU 301 is a repetition of "0" to "255", it is determined that both of the substrates 200 and 214 are normal. The processing routine advances to step S710. If an abnormality is found out in the data read by the CPU 301, step S720 follows.

CPU-ACC is set to 0 in step S710 and COLOR is set to "1" in step S711, thereby allowing the C signal to be outputted from the output of the masking UCR unit 207.

CPU-ACC is set to "1" in step S712. In step S713, the CPU 301 reads the image data written in the RAM 218 for magnification. In step S714, a check is made to see if the read image data is normal.

A discriminating method will now be specifically explained.

Figure 10:
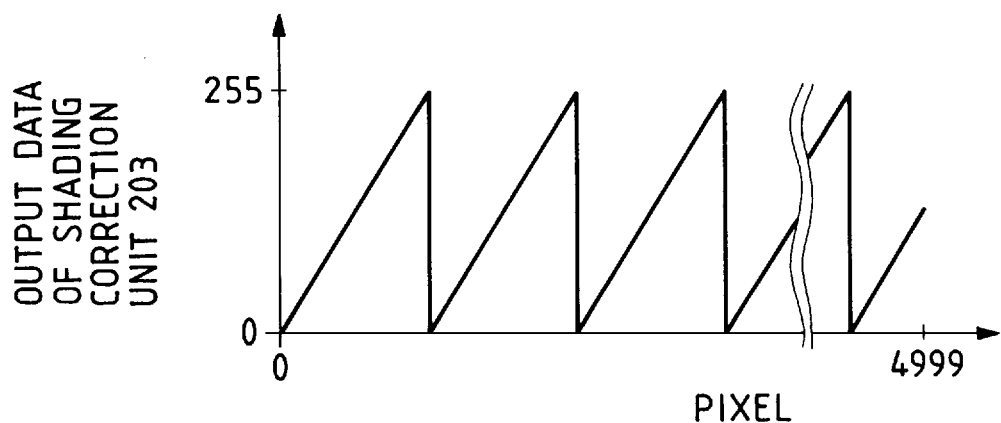
FIG. 10 is a diagram showing data which is outputted from the shading correction unit.

At the time of the self-diagnosis, the data of "0" to "255" has repetitively been written in all addresses (as many as 5000 pixels) in each of the RAMs existing in the blocks 401, 402, and 403 in FIGS. 4A to 4C as shown in FIG. 9. Therefore, the data of "0" to "255" is repetitively outputted from the shading correction unit 203 in FIG. 1 with respect to each of the signals of R, G, and B as shown in FIG. 10.

The data written in the RAM 218 for magnification ought to be a repetition of the data of "0" to "255" in accordance with the order from address 0 in the RAM 218 for magnification.

Figure 11:
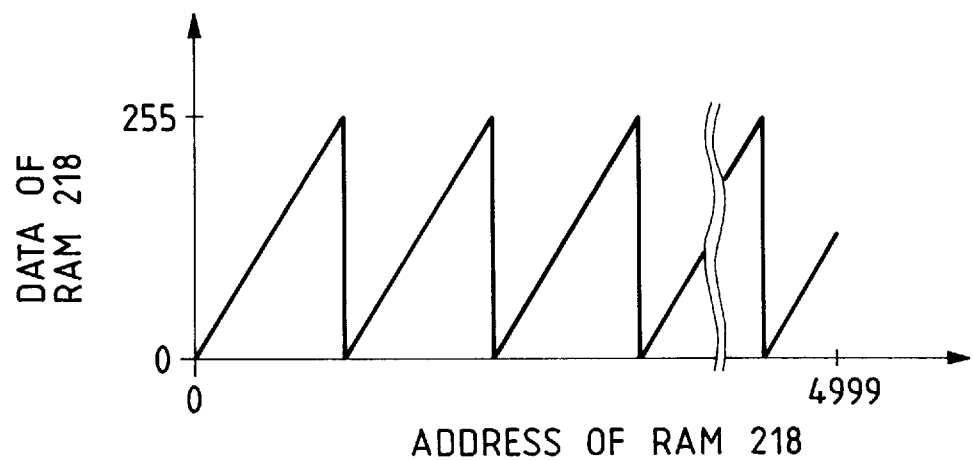
FIG. 11 is a diagram showing data written in an RAM for magnification.
Figure 12:
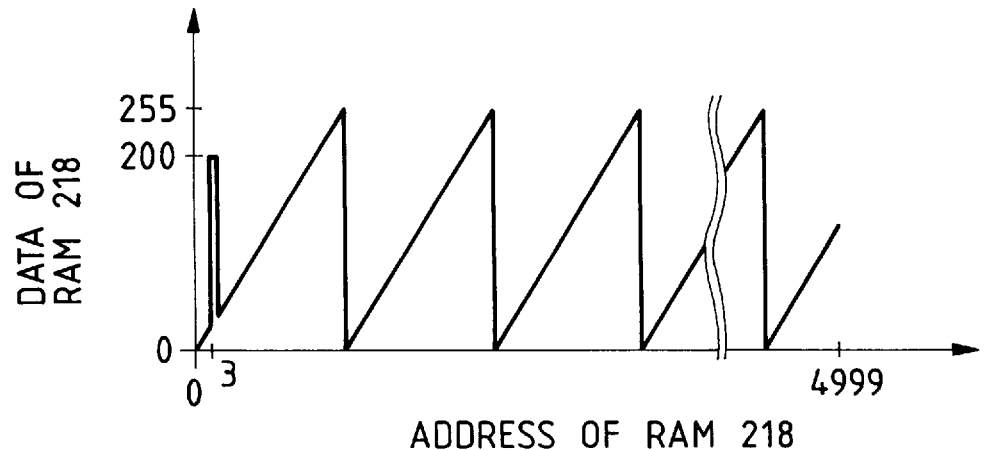
FIG. 12 is a diagram showing data which passed through a failed portion and was written in the RAM for magnification.

If any one of the data different from the expected data is found, it is determined that there is an abnormality of circuitry on that substrate. For example, if the relation between the addresses in the RAM 218 for magnification and the data is as shown in FIG. 11, the substrate can be determined to be normal. However, as shown in FIG. 12, although "3" should be written as data in address 3, if data other than "3", for instance, data of "200" has been stored, the substrate is determined to be abnormal. The discriminating method in this instance is common in steps S709, S714, S719, S725, S732, and S737.

When it is decided as being normal in step S714, step S715 follows. When it is decided as being abnormal, step S720 follows.

In step S715, CPU-ACC is set to "0". In step S716, COLOR is set to "2", thereby allowing the Y signal to be outputted from an output of the masking UCR unit 207.

In step S717, CPU-ACC is set to "1". In step S718, the CPU 301 reads the image data written in RAM 218 for magnification. In step S719, a check is made to see if the read image data is normal. If YES, step S740 follows and it is determined that there is no abnormality of all of the substrates. The self-diagnosis is finished. When it is decided to be abnormal in step S719, step S720 follows.

In step S720, CPU-ACC is set to "0". In step S721, ADD-IN is set to "0". When the ADD-IN signal is set to "0", the signal doesn't pass the image processing unit 213 but the output signal of the masking UCR unit 207 is inputted as it is to the F value correcting unit 208.

In step S722, COLOR is set to "0", thereby allowing the M signal to be outputted from the output of the masking UCR unit 207.

In step S723, CPU-ACC is set to "1". In step S724, the data in the RAM for magnification is read out. In step S725, a check is made to see if the data in the RAM is normal. When it is determined to be abnormal in step S725, it is decided that there is an abnormality of the substrate 200 in step S726. The processing routine advances to step S727 and an abnormality of the substrate 200 is notified. The self-diagnosis is finished. However, when it is determined to be normal in step S725, step S728 follows.

In step S728, CPU-ACC is set to "0". In step S716, COLOR is set to "1", thereby allowing the C signal to be outputted from the output of the masking UCR unit 207.

In step S730, CPU-ACC is set to "1". In step S731, the CPU 301 reads the image data written in the RAM 218 for magnification. In step S732, a check is made to see if the read image data is normal. If YES, step S733 follows. When it is determined to be abnormal in step S732, step S726 follows.

In step S726, it is decided that there is an abnormality of the substrate 200. Step S727 follows and the abnormality of the substrate 200 is notified. The self-diagnosis is finished.

In step S733, CPU-ACC is set to "0". In step S734, COLOR is set to "2", thereby allowing the Y signal to be outputted from the output of the masking UCR unit 207.

In step S735, CPU-ACC is set to "1". In step S736, the CPU 301 reads the image data written in the RAM 218 for magnification. In step S737, a check is made to see if the read image data is normal. If YES, step S738 follows and it is decided that there is an abnormality of the substrate 214. In step S739, the abnormality of the substrate 214 is notified. The self-diagnosis is finished.

When it is determined to be abnormal in step S732, step S726 follows.

In step S726, it is determined that there is an abnormality of the substrate 200. Step S727 follows and the abnormality of the substrate 200 is notified. The self-diagnosis is finished.

When an abnormality is found as a result of the self-diagnosis, a fact that there is the abnormality of the substrate is notified to the external apparatus 151 of the service center of the copying apparatus through the public telephone line by using the I/F unit 113 in steps S726 and S739. In this instance, since the substrate in which a problem exists has been identified, the number of substrates to be ordered for the service person to replace can be minimized. The time which is required for replacement is also reduced.

Second Embodiment

In a construction similar to the foregoing first embodiment, it is apprehended that if the user presets so that the self-diagnosis is automatically performed at the time of power-on, a leading time of the apparatus becomes slow. In such a case, the self-diagnosis can be also started by an instruction by a communication from the service base in a time zone such as midnight or the like when the user hardly uses the apparatus.

Figure 8A:
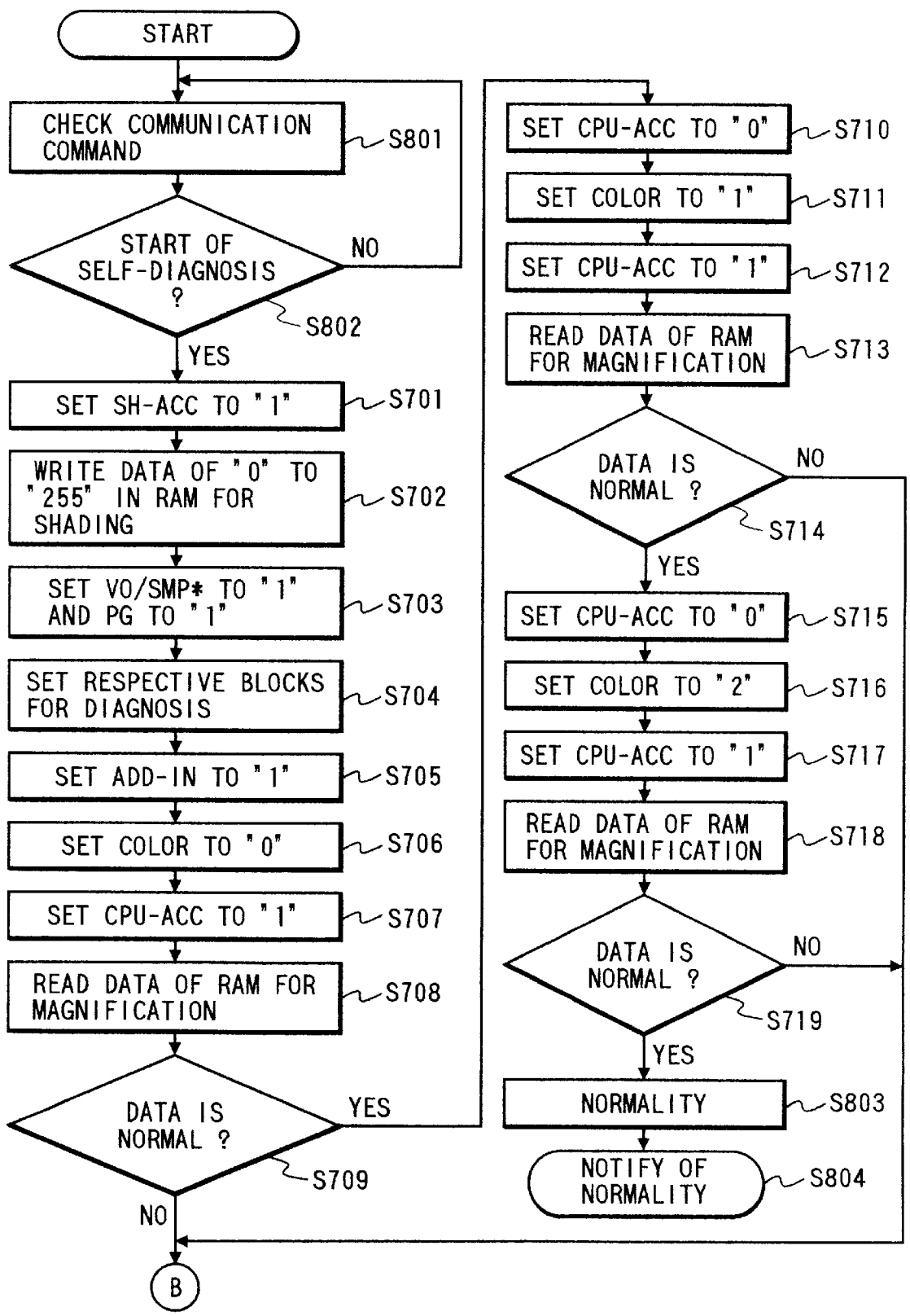
FIGS. 8A and 8B are flowcharts for explaining a self-diagnosing operation in the second embodiment of the invention.
Figure 8B:
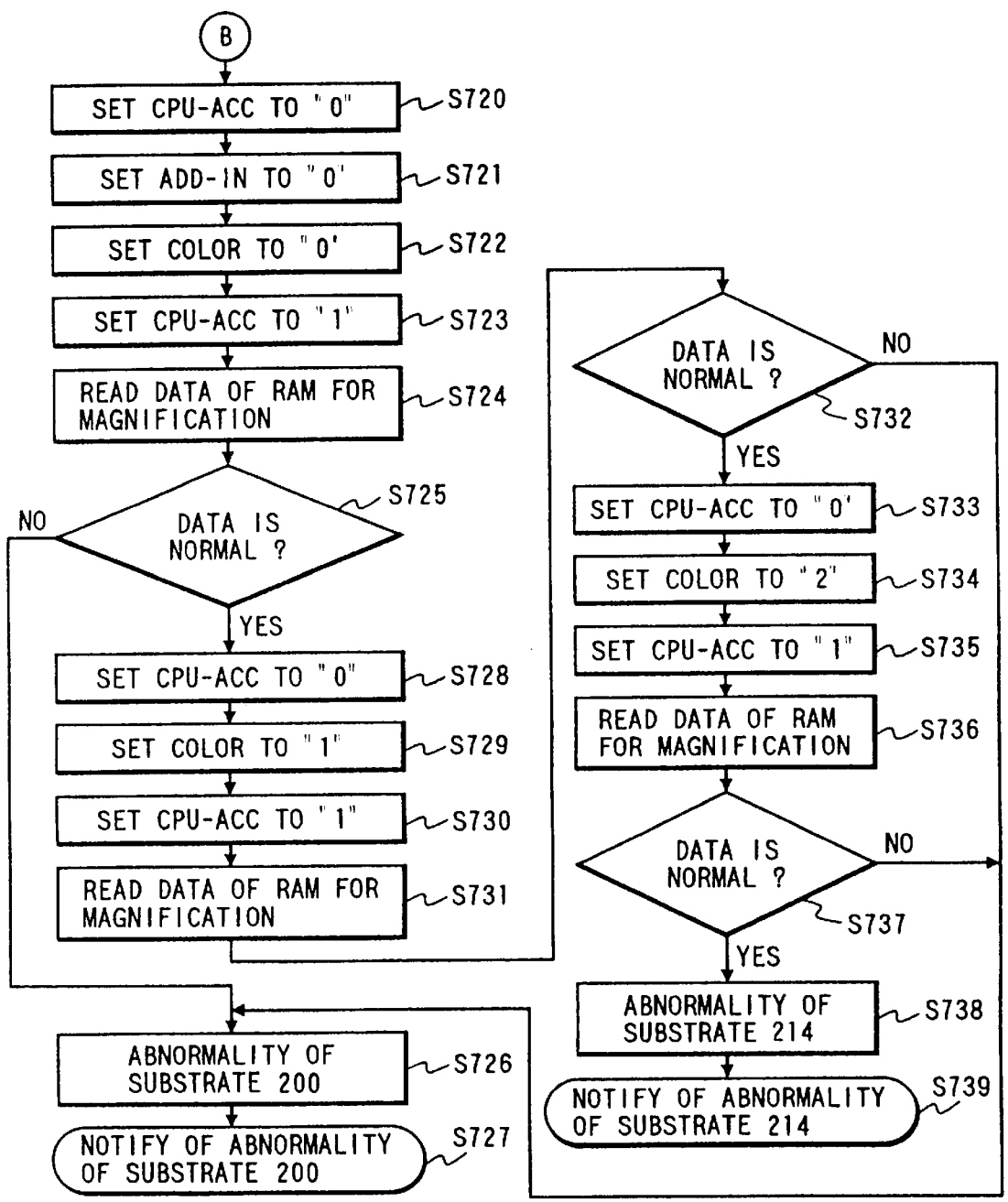

A procedure corresponding to such a case is shown in flowcharts of FIGS. 8A and 8B. In FIG. 8A, a communication command is checked in step S801. In step S802, when it is determined that there is an instruction to start the self-diagnosis, the processing routine advances to step S701. If NO, the processing routine is returned to step S801.

Processes in steps S701 to S719 are similar to those in the flow in the first embodiment.

In step S803, it is determined that all substrates are normal. Step S804 follows and the fact that all of the substrates are normal is conveyed to the external apparatus 515 by way of notification. The self-diagnosis is finished.

That is, since the instruction to start the self-diagnosis is an instruction issued from the external apparatus 515, even when the result of the self-diagnosis is normal or when it is abnormal, such a fact is conveyed to the external apparatus 515.

After completion of the self-diagnosis, the communication command is again checked in step S801.

By performing the self-diagnosis as mentioned above, for example, if there is an abnormality of a substrate, the substrate is replaced in the next morning, so that undesired stoppage of the apparatus can be reduced as much as possible.

As described above, the processing route of the image data is changed, predetermined test pattern image data is processed, a failed portion in the processing circuit of the image is specified from the processing result, and it is notified to the external apparatus. Thus, the circuit to be replaced can be promptly identified to the service person and the procedure necessary at the time of the occurrence of a failure can be promptly performed.

What is claimed is:

1. An image processing apparatus having a plurality of changeable processing routes for processing image data, comprising:

generating means for generating predetermined test image data;

control means for sequentially causing said test image data generated by said generating means to flow through each of said plurality of processing routes;

discriminating means for discriminating a failed portion in said processing routes, on the basis of said test image data caused to flow through each of said processing routes; and transmitting means for transmitting a discrimination result obtained by said discriminating means to an external apparatus.

2. An apparatus according to claim 1, wherein said processing routes are made up of a plurality of processing circuits and said processing circuits are formed on a plurality of substrates, and said discriminating means discriminates the presence or absence of a failure of said processing circuit substrate by substrate.

3. An apparatus according to claim 1, further having receiving means for receiving an instruction to make said control means and said discriminating means function through communicating means.

4. An apparatus according to claim 1, wherein said generating means reads out contents in a memory for correcting a shading of said image data as said test image data.

5. An apparatus according to claim 1, wherein said processing routes are made up of a plurality of processing circuits, and said discriminating means discriminates a failure of said plurality of processing circuits on the basis of contents in a memory for magnification in which the image data processed by said processing circuits are written.

6. An apparatus according to claim 1, wherein said processing routes are made up of a plurality of processing circuits, and said plurality of processing circuits process color image data.

7. An apparatus according to claim 1, wherein said processing routes are made up of a plurality of processing circuits, and said plurality of processing circuits are circuits for processing the image data read out from reading means for reading an image.

8. An apparatus according to claim 1, wherein said processing routes are made up of a plurality of processing circuits, and said plurality of processing circuits are circuits for processing said image data and outputting recording data to recording means for recording an image.

9. An apparatus according to claim 1, further having setting means for setting so as to output the image data as it is without being subjected to an image process in said processing routes.

10. An apparatus according to claim 1, wherein said processing routes sequentially process every color component, and said control means allows the test image data to be transmitted to said plurality of processing routes for every color component.

11. A copying apparatus having reading means capable of reading an image of an original, recording means capable of recording the image, and a plurality of changeable processing routes for processing image data read by said reading means and outputting recording data to said recording means, comprising:

generating means for generating predetermined test pattern image data;

control means for sequentially causing said test pattern image data generated by said generating means to flow through each of said plurality of processing routes;

discriminating means for discriminating a failure in said processing routes on the basis of said test pattern image data caused to flow through each of said processing routes; and transmitting means for transmitting a discrimination result obtained by said discriminating means to an external apparatus.

12. An image processing apparatus having a plurality of changeable processing routes for processing image data, comprising:

generating means for generating predetermined test image data;

control means for sequentially causing said test image data generated by said generating means to flow through each of said plurality of processing routes;

discriminating means for discriminating a failed portion in said processing routes, on the basis of said test image data caused to flow through each of said processing routes; and receiving means for receiving an instruction to make said control means and said discriminating means function through communicating means.

13. A copying apparatus having reading means capable of reading an image of an original, recording means capable of recording the image, and a plurality of changeable processing routes for processing image data read by said reading means and outputting recording data to said recording means, comprising:

generating means for generating predetermined test pattern image data;

control means for sequentially causing said test pattern image data generated by said generating means to flow through each of said plurality of processing routes;

discriminating means for discriminating a failure in said processing routes on the basis of said test pattern image data caused to flow through each of said processing routes; and receiving means for receiving an instruction to make said control means and said discriminating means function through communicating means.

14. An diagnosing method for an image processing apparatus using a plurality of changeable processing routes for processing image data, comprising the steps of:

generating predetermined test image data;

sequentially causing said test image data generated in said generating step to flow through each of said plurality of processing routes;

discriminating a failed portion in said processing routes, on the basis of said test image data caused to flow through each of said processing routes; and transmitting a discrimination result obtained in said discriminating step to an external device.

15. A method according to claim 14, wherein said processing routes are made up of a plurality of processing circuits and said processing circuits are formed on a plurality of substrates, and the presence or absence of a failure of said processing circuit is discriminated substrate by substrate.

16. A method according to claim 14, further comprising receiving an instruction to make a control means and a discriminating means function through communicating means.

17. A method according to claim 14, wherein, in said generating step, contents in a memory are read out for correcting a shading of said image data as said test image data.

18. A method according to claim 14, wherein said processing routes are made up of a plurality of processing circuits, and a failure of said plurality of processing circuits is discriminated on the basis of contents in a memory for magnification in which the image data processed by said processing circuits are written.

19. A method according to claim 1, wherein
said processing routes are made up of a plurality of processing circuits, and
said plurality of processing circuits process color image data.

20. A method according to claim 14, wherein
said processing routes are made up of a plurality of processing circuits, and
said plurality of processing circuits are circuits for processing the image data read out from reading means for reading an image.

21. A method according to claim 14, wherein
said processing routes are made up of a plurality of processing circuits, and
said plurality of processing circuits are circuits for processing said image data and outputting recording data to recording means for recording an image.

22. A diagnosing method for an image processing apparatus using a plurality of changeable processing routes for processing image data, comprising the steps of:
generating predetermined test image data;
sequentially causing said test image data generated in said generating step to flow through each of said plurality of processing routes;
discriminating a failed portion in said processing routes, on the basis of said test image data caused to flow through each of said processing routes; and
receiving an instruction to make a control means and a discriminating means function through communicating means.

23. An image processing apparatus having a plurality of changeable processing routes for processing image data, comprising:
generating means for generating predetermined test image data;
control means for sequentially causing said test image data generated by said generating means to flow through each of said plurality of processing routes; and
discriminating means for discriminating a failed portion in said porcessing routes, on the basis of said test image data caused to flow through each of said processing routes.

24. An apparatus according to claim 23, wherein said processing routes are made up of a plurality of processing circuits and said processing circuits are formed on a plurality of substrates, and said discriminating means discriminates the presence or absence of a failure of said processing circuit on a unit basis of said substrates.

25. An apparatus according to claim 23, wherein said generating means reads out contents in a memory for correcting a shading of said image data as said test image data.

26. An apparatus accoridng to claim 23, wherein said processing routes are made up of a plurality of processing circuits, and said discriminating means discriminates a failure of said plurality of processing circuits on the basis of contents in a memory for magnification in which the image processed by said processing circuits are written.

27. An apparatus according to claim 23, wherein said processing routes are made up of a plurality of processing circuits, and said plurality of processing circuits process color image data.

28. An apparatus according to claim 23, wherein said processing routes are made up of a plurality of processing circuits, and said plurality of processing circuits are circuits for processing the image data read out from reading means for reading an image.

29. An apparatus according to claim 23, wherein said processing routes are made up of a plurality of processing circuits, and said plurality of processing circuits are circuits for processing said image data and outputting recording data to recording means for recording a image.

30. An apparatus according to claim 23, further having a setting means for setting so as to output the image data as it is without being subjected to an image process in said processing routes.

31. An apparatus according to claim 23, wherein said processing routes for sequentially process every color component, and said control means allows the test image to flow through said plurality of processing routes for every color component.

32. A copying apparatus having reading means capable of reading an image of an original, recording means capable of recording the image, and a plurality of changeable processing routes for processing image data read by said reading means and outputting recording data to said recording means, comprising:
generating means for generating predetermined test pattern image data;
control means for sequentially causing said test pattern image data generated by said generating means to flow through each of said plurality of processing routes;
discriminating means for discriminating a failure in said processing routes on the basis of said test pattern image data caused to flow through each of said processing routes; and
transmitting means for transmitting a discrimination result obtained by said discriminating means to an external apparatus.

33. A diagnosing method of an image processing apparatus having a plurality of changeable processing routes for processing image data, comprising the steps of:
generating predetermined test image data;
sequentially causing said test image data generated in said generating step to flow through each of said plurality of processing routes;
discriminating a failed portion in said processing routes, on the basis of said test image data caused to flow through each of said processing routes; and
transmitting a discrimination result obtained in said discriminating step to an external device.

34. A method according to claim 33, wherein said processing routes are made up of a plurality of processing circuits and said processing circuits are formed on a plurality of substrates, and the presence or absence of a failure of said processing circuit is discriminated substrate by substrate.

35. A method according to claim 33, wherein, in said generating step, contents in a memory are read out for correcting a shading of said image data as said test image data.

36. A method according to claim 33, wherein said processing routes are made up of a plurality of processing circuits, and a falilure of said plurality of processing circuits is discriminated on the basis of contents in a memory for magnification in which the image data processed by said processing circuits are written.

37. A method according to claim 33, wherein said processing routes are made up of a plurality of processing circuits, and said plurality of processing circuits process color image data.

38. A method according to claim 33, wherein said processing routes are made up of a plurality of processing circuits, and said plurality of processing circuits are circuits for processing the image data read out from reading means for reading an image.

39. A method according to claim 33, wherein said processing routes are made up of a plurality of processing circuits, and said plurality of processing circuits are circuits for processing said image data and outputting recording data to recording means for recording an image.

40. A method according to claim 33, further having a step of setting so as to output the image data as it is without being subjected to an image process in said processing routes.

41. A method according to claim 33, wherein said processing routes sequentially process every color component, and allows the test image data to flow through said plurality of processing routes for every color component.

42. A method according to claim 14, further having a step of setting so as to output the image data as it is without being subjected to an image process in said processing routes.

43. A method according to claim 14, wherein said processing routes sequentially process every color component, and allows the test image data to flow through said plurality of processing routes for every color component.

* * * * *

UNITED STATES PATENT AND TRADEMARK OFFICE
CERTIFICATE OF CORRECTION

PATENT NO. : 6,023,595

DATED : February 8, 2000

INVENTORS : TAKASHI SUZUKI et al.

It is certified that error appears in the above-identified patent and that said Letters Patent is hereby corrected as shown below:

COLUMN 1

Line 21, "a" should read --the--.

COLUMN 2

Line 17, "cross sectional" should read --cross-sectional--.

Line 18, "is" should read --this--.

Line 47, "onto" should read --on--.

COLUMN 4

Line 41, "of" should read --of a--.

Line 67, "memory of" should read --means of--.

UNITED STATES PATENT AND TRADEMARK OFFICE
CERTIFICATE OF CORRECTION

PATENT NO. : 6,023,595

DATED : February 8, 2000

INVENTORS : TAKASHI SUZUKI et al.

It is certified that error appears in the above-identified patent and that said Letters Patent is hereby corrected as shown below:

COLUMN 5

Line 18, "thin" should read --thinning--.

COLUMN 6

Line 14, "signals." should read --signals:--.

Signed and Sealed this

Twenty-seventh Day of March, 2001

*Attest:*

NICHOLAS P. GODICI

*Attesting Officer*  Acting Director of the United States Patent and Trademark Office